J. L. SCHMIDT.
COIN RECEIVING, REGISTERING, AND SLIP ISSUING MACHINE.
APPLICATION FILED MAR. 23, 1914.

1,245,391.

Patented Nov. 6, 1917.
7 SHEETS—SHEET 1.

Witnesses:
L. B. Graham
R. E. Wighton

Inventor:
John L. Schmidt,
By Heidman Street,
Attys.

UNITED STATES PATENT OFFICE.

JOHN L. SCHMIDT, OF INDIANAPOLIS, INDIANA.

COIN RECEIVING, REGISTERING, AND SLIP-ISSUING MACHINE.

1,245,391.         Specification of Letters Patent.         Patented Nov. 6, 1917.

Application filed March 23, 1914. Serial No. 826,713.

*To all whom it may concern:*

Be it known that I, JOHN L. SCHMIDT, a citizen of the United States, and resident of Indianapolis, county of Marion, and State of Indiana, have invented certain new and useful Improvements in Coin Receiving, Registering, and Slip-Issuing Machines, of which the following is a description, reference being had to the accompanying drawings, which form a part of my specification.

My invention relates to a machine intended to be composed of a number of units, each unit whereof is adapted to receive coins of a specific size or denomination; the coins being intended to release mechanism and permit of the proper operation of the machine so as to enable the manipulator to receive proper evidence of the deposit made by him.

The object of my invention is to provide a machine of the class specified whereby the coins of proper thickness and diameter, in other words, good coins, can only be introduced; the coin, if meeting the requirements of the machine, will automatically release mechanism whereby a record of the introduced coin is made and an indicating ticket or deposit slip issued to the manipulator; said ticket or deposit slip being provided with proper indicia during the operation of the machine whereby the owner of the machine may determine the machine issuing the ticket as well as the time at which the same is issued, as will more fully be understood from the following detailed description:—

As my invention contemplates a machine composed of a number of units, each of which is intended to receive a coin of different denomination, I illustrate and describe a single unit or single coin-receiving slide and its correlated parts, which will suffice as an exemplification of the principle of my invention; it being understood, of course, that the units of which the machine is composed may correspond in number with the different denominations of coins which the machine is intended to receive, and the only difference between the various units would be in the size of the various parts of the coin inserting and detecting mechanism and the size of the cylinders or receptacles intended to receive the inserted or deposited coin; the releasing mechanism, slip or ticket issuing or printing mechanism, and other correlated parts, being identical in the various units.

Figure 2:
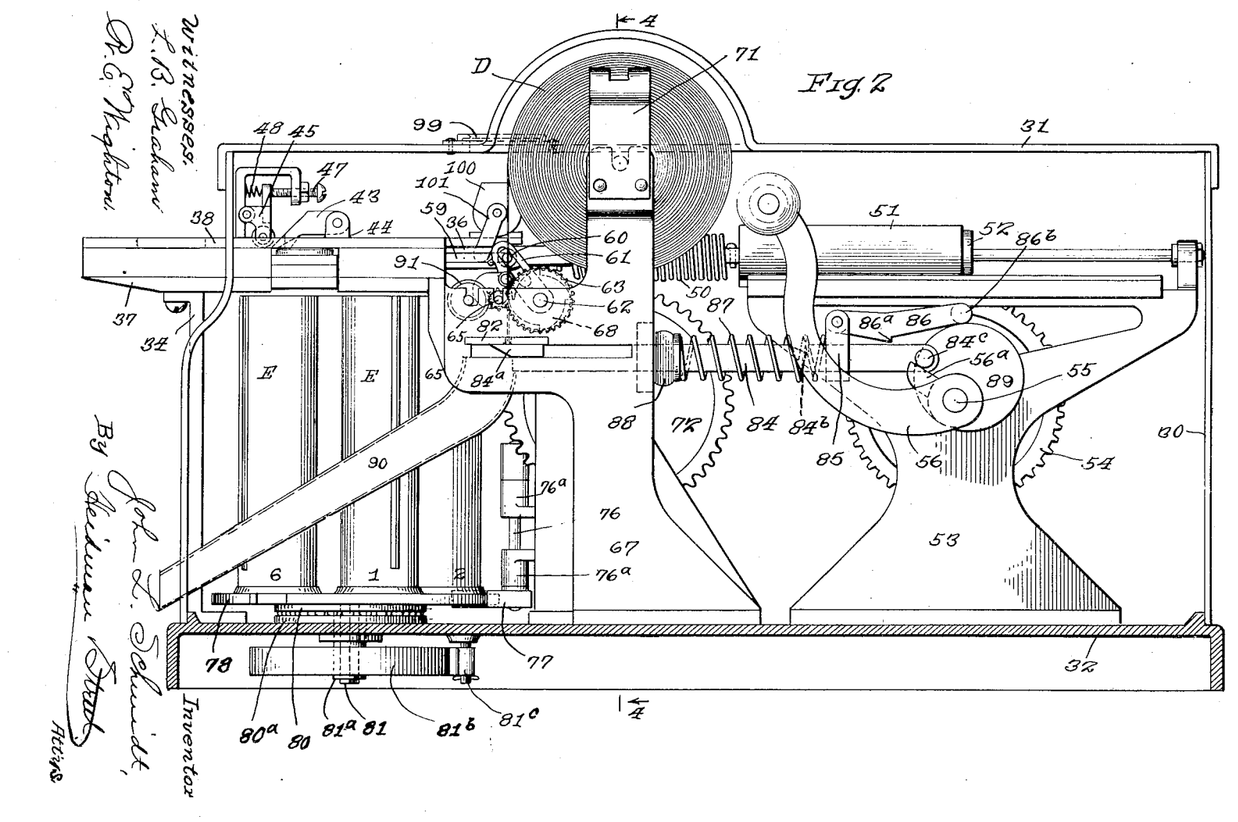
Fig. 2 is a side elevation of the machine taken from the crank or operating side, with the side of the casing removed.

The machine is provided with a suitable casing 30, which may be provided with a removable top or cover 31 which may be suitably locked in place so as to prevent undue tampering with, or access being had to, the machine; the base of the casing being shown so formed as to permit of the location of a portion of the mechanism beneath the bottom and yet its proper operation not be interfered with, as very clearly shown in Fig. 2, where the bottom 32 is provided with downwardly depending flanges of sufficient width to provide proper support for the machine without having its weight rest upon the mechanism shown located beneath the bottom. It is evident, of course, that the construction of the casing may be varied and given any suitable shape and size, without, however, altering the construction and operation.

Figures 10, 11, 12, 13, 14, 15, 21, 22, 23:
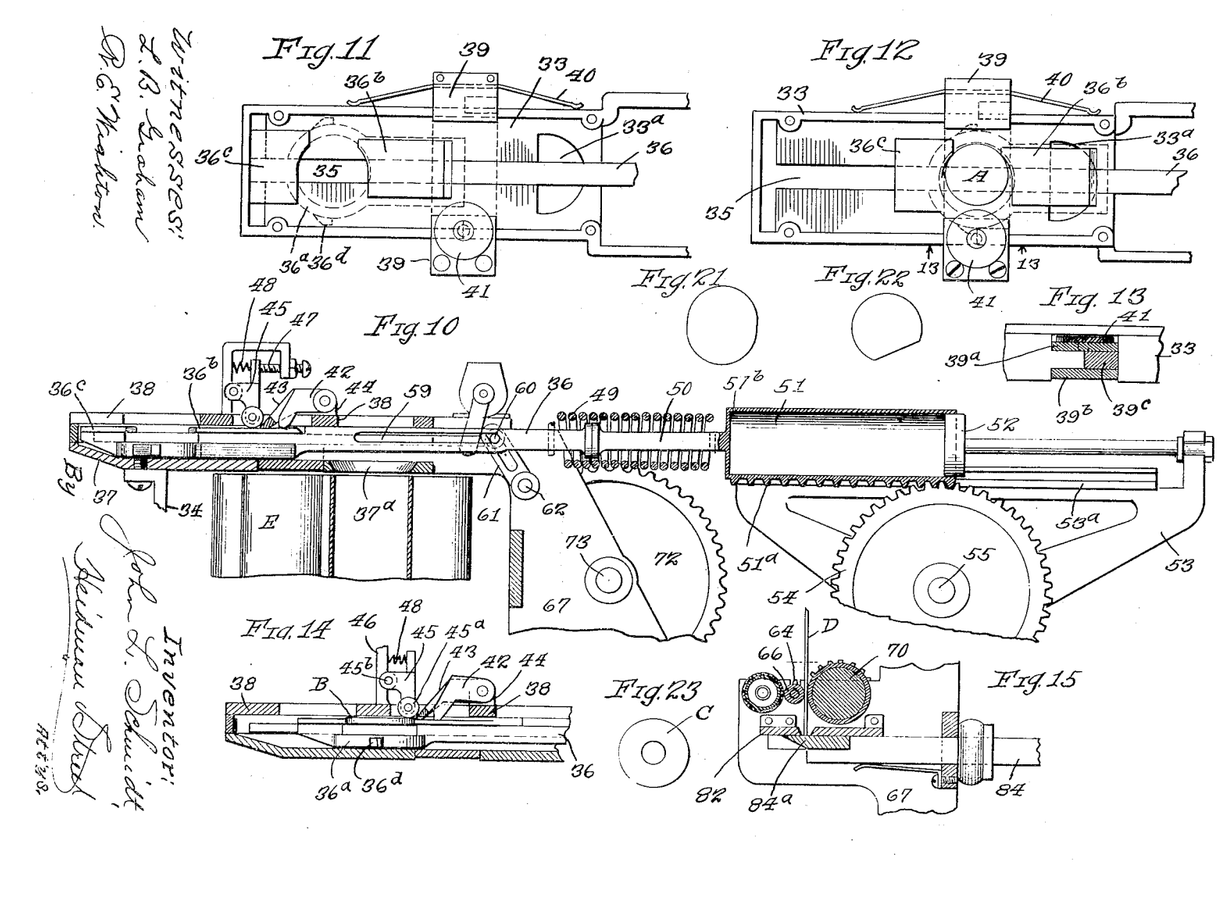
Fig. 10 is a longitudinal sectional view taken on the line 10—10 of Fig. 1, looking in the direction of the arrows, with the lower portion of the machine and mechanism broken away.
Fig. 11 is a detail plan view of the coin-inserting mechanism and supporting slide therefor, the mechanism being shown with the top plate and a portion of the locking mechanism removed.
Fig. 12 is a similar view showing the coin-inserting mechanism or member pushed inwardly to a point where the coin encounters some of the releasing or detecting mechanism.
Fig. 13 is a section taken on line 13—13 of Fig. 12, looking in the direction of the arrows.
Fig. 14 is a detail sectional view of the coin-inserting mechanism and a portion of the releasing or detecting mechanism; the coin-inserting mechanism being provided with a coin of improper thickness; the coin being shown in engagement with a portion of the releasing or detecting mechanism whereby its further inward travel is prevented.
Fig. 15 is a detail sectional view in elevation of the ticket or slip printing and severing mechanism, being taken on the line 15—15 of Fig. 1, looking in the direction of the arrows.
Figs. 21, 22, and 23 illustrate improper shaped coins and slugs or washers which my improved mechanism is adapted to detect and prevent being inserted.

Extending through the front of the casing of the machine, I provide a suitable channel casting or slideway 33, the construction whereof is more clearly shown in Figs. 11 and 12; the outer or forward end of the member being preferably supported by the standard 34, shown in Fig. 2. The channel casting or slideway 33 is provided with a slot 35 extending longitudinally through the center of the bottom to receive the slide-rod 36, the forward end whereof is preferably provided with the ring portion 36ª of a size sufficient to permit the coin, which the introducing mechanism is adapted to receive, to drop through the ring portion 36ª after the slide-rod has been drawn into the machine to its fullest extent, namely after it has been drawn in to a point where the ring portion 36ª is brought to register with an opening 33ª of the channel casting or slideway 33.

The forward end of the slide-rod is provided with plates 36ᵇ and 36ᶜ on opposite sides of the ring portion 36ª and separated a sufficient distance to receive the coin for which the unit is intended. It will be understood that the ring portion 36ª is preferably arranged in a plane beneath the horizontal plane of the longitudinal axis of slide-rod 36, as more clearly shown, for example, in Fig. 14, in order that the ring portion 36ª may slide along beneath the bottom of channel casting or member 33, as can be seen in Figs. 11, 12, and 14. The plates 36ᵇ and 36ᶜ will maintain the proper relative position of the slide-rod to the slide-channel or casting 33; the plates being intended to slide along the casting or channel 33. The construction of the slide-channel and the relative position of the slide-rod, may be very clearly seen in Fig. 6. From this figure it will be noted that the channel member or casting 33 is provided with an outer bottom member 37 which receives the securing bolt or screw whereby the bottom member 37 is secured to the standard or support 34. The channel-casting or member 33 is also provided with a cover member or plate 38 which may be removably secured to the casting, which plate 38 is provided with the cut-out portion or slot extending toward the center thereof from one side, as more clearly shown in Fig. 1, in order to permit the proper passing or insertion of the coin. In order to induce the proper centering of the coin, I show the plates 36ᵇ and 36ᶜ provided with oppositely presented protruding portions on the sides opposite to that from which the coin is intended to be inserted, thus preventing the coin being moved too far beyond the longitudinal center line or axis of the slide-rod.

At a point intermediate of its ends, and within the casing of the machine, I provide the channel member 33 with a transversely extending portion or bridge 39 which is preferably composed of the top portion or plate 39ᵃ, and the bottom plate or member 39ᵇ. The bottom plate or member 39ᵇ is provided with the upwardly and inwardly presented portions or lugs 39ᶜ and 39ᵈ, which are arranged to extend through suitable slots formed in opposite sides of the channel-casting or member 33, as can more clearly be seen in Fig. 8. The transversely extending bridge members or plates 39ᵃ and 39ᵇ are intended to move transversely of channel 33. The bridge is, therefore, constructed so as to have the bottom plate 39ᵇ extending beneath the channel-member 33, while the lugs or protrusions 39ᶜ and 39ᵈ, which may be integral with the upper face of bottom plate 39ᵇ, register with the slots in the sides of the channel 33; while the top plate 39ᵃ, which may be removably secured to the bottom plate 39ᵇ in any suitable manner, is adapted to extend beneath plate 38 secured to the top of channel-member 33, thus maintaining the proper relative position of the transversely extending members, but permitting the transverse movement thereof in the manner hereinafter explained.

Figures 4, 5, 6, 7, 8, 9:
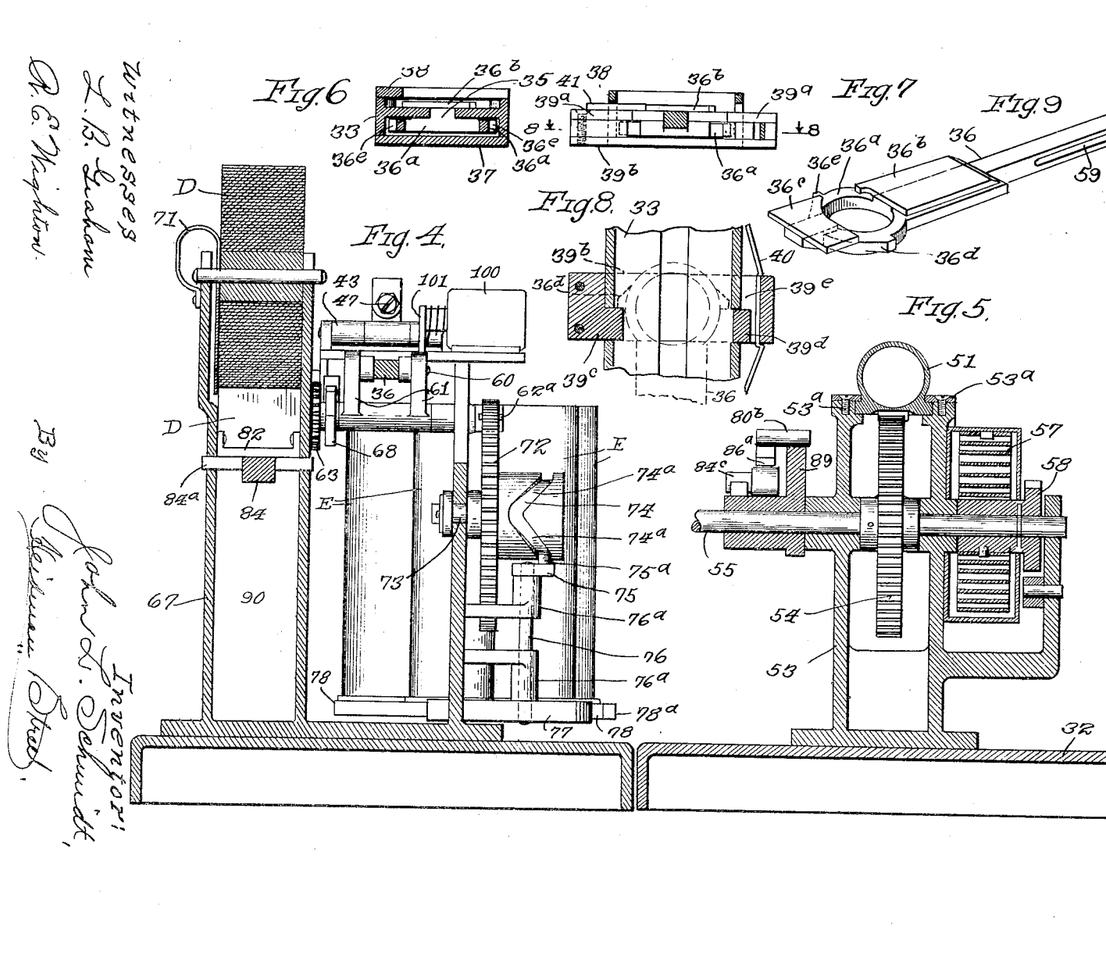
Fig. 4 is a vertical sectional view taken on the line 4—4 of Fig. 2, looking in the direction of the arrows.
Fig. 5 is a vertical sectional view taken on the line 5—5 of Fig. 1, looking in the direction of the arrows.
Fig. 6 is a detail sectional view taken on the line 6—6 of Fig. 1, looking in the direction of the arrows.
Fig. 7 is a detail sectional view taken on the line 7—7 of Fig. 1, looking in the direction of the arrows, with the pawl-holding member removed.
Fig. 8 is a sectional view taken on the line 8—8 of Fig. 7, looking in the direction of the arrows.
Fig. 9 is a detail perspective view of the coin-inserting mechanism.

The bottom member 39ᵇ is shown provided at one end, that is, on one side of channel-member 33, with a slotway 39ᵉ, through which extends spring 40 of any suitable construction, being shown in the nature of a leaf spring having its free ends bearing against the sides of channel-member 33 as very clearly shown in Figs. 8, 11, and 12. The object of the spring 40 is to maintain the laterally movable locking mechanism, composed of members 39ᵃ, 39ᵇ, 39ᶜ, and 39ᵈ, in the normal position shown in Figs. 8 and 11, that is in the position where lug or protrusion 39ᶜ will extend into the channel or slide-way of member 33, while lug or protrusion 39ᵈ is shown substantially flush with the sides of channel 33 and therefore out of the path of protrusions or lugs on slide-rod 36, now to be described.

As clearly shown in Fig. 9, the ring portion 36ᵃ has lugs 36ᵈ and 36ᵉ extending outwardly from the sides, namely at points diametrically opposite each other. The top member 39ᵃ is provided with a revolubly mounted disk 41 located so as to extend into the path of the coin inserted between plates 36ᵇ and 36ᶜ of slide-rod 36, so as to be engaged by the edge of the coin when the rod 36 is moved inwardly. It is evident from this construction that the coin when brought into engagement with disk 41 will force the bridge members 39ᵃ and 30ᵇ toward one side of channel 33, that is against the action of spring 40, and thereby move protrusion or lug 39ᶜ of bottom member 39ᵇ out of the path of lug 36ᵈ, (the lug 36ᵈ being shown in dotted lines in Fig. 8 in engagement with protrusion 39ᶜ), thus allowing the further inward travel of slide-rod 36. The action just described will result if the coin is of proper diameter. Should the coin, however, be of irregular diameter, as for example of the nature shown in Fig. 22, namely of smaller diameter than the diameter of the coin the slide is intended to receive, it is evident that disk 41 will not be engaged by the spurious coin, or, if engaged, will not move bridge members 39ᵃ and 39ᵇ sufficiently far in opposition to the spring 40 to prevent the engagement of lug 36ᵈ by member 39ᶜ, and the further inward travel of rod 36 prevented; a coin of too small diameter being shown at A in Fig. 12, inserted between plates 36ᵇ and 36ᶜ of slide-rod 36, and the action of the mechanism being clearly apparent from Fig. 12. Should the spurious coin be circular, but too large in diameter, it could not be inserted between plates 36ᶜ and 36ᵇ. If the coin is of the construction shown in Fig. 21, having the flat sides which would permit its insertion between plates 36ᵇ and 36ᶜ, then the coin will force disk 41 and with it the bridge members 39ᵃ and 39ᵇ, against the action of spring 40 such distance as to bring protrusion or lug 39ᵈ into the path of lug 36ᵉ on slide-rod 36, and again prevent further inward movement of slide-rod 36.

It is evident from the construction just described that the coin must be of proper diameter in order to permit of the complete inward movement of the slide-rod, so far as the bridge members are concerned.

Figures 1, 24, 25:
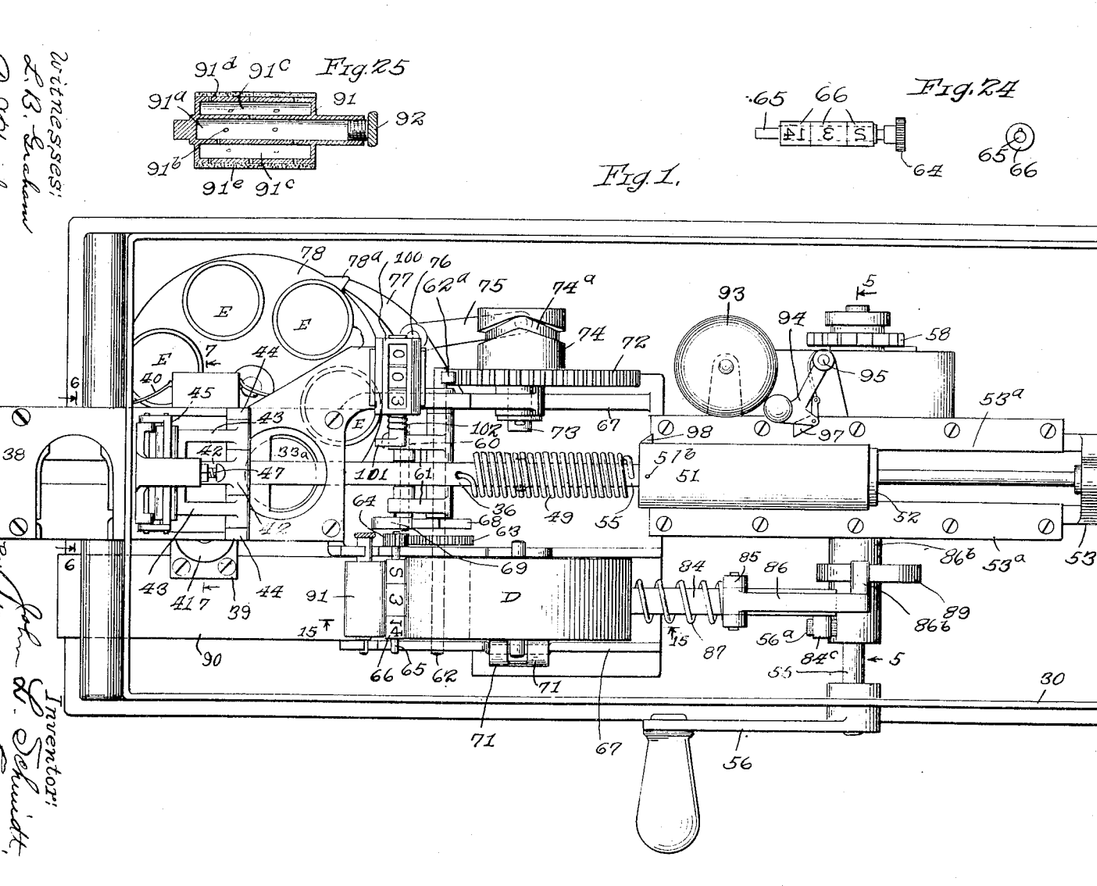
Figure 1 is a top plan view of one unit of the machine, with the top or cover of the machine removed.
Fig. 24 shows detail views of the printing or type roller in side and end elevation.
Fig. 25 is a detail view of the inking mechanism in longitudinal section.

The cover plate 38 of the bridge 39 is provided with the pivoted pawls 42 and 43, more clearly shown in Figs. 10 and 14, which are pivoted to the upwardly presented lugs 44, see Figs. 1, 10, and 14, so that the pawls may move vertically. In the construction illustrated in the drawings, the pawl 43 is preferably provided with a knife edge, and is shown in Fig. 1 as extending substantially throughout the width of the channel or slideway through which the coin must travel when slide-rod 36 is moved inwardly. The pawl 43 is shown consisting of an open frame, as clearly shown in Fig. 1, so as to permit the pawl 42 to be pivoted intermediate of the pivot points of pawl 43. The object in providing pawl 43 is to prevent the proper operation of the machine when an attempt is made to introduce a spurious coin or slug of improper thickness. The two pawls are arranged to operate independently of each other, and the function of pawl 43 is very clearly illustrated in Fig. 14 where it is shown abutting against the coin B, which is of too great thickness, thus making the further inward movement of the slide member 36 impossible. Again, if the coin is too thin, then pawl 43 will slide across the face of the coin and abut against the inner edge of plate 36ᶜ and thus prevent further inward movement of slide rod 36. The function of pawl 42 is to prevent the introduction of slugs or washers of the character disclosed in Fig. 23, which, however, may be of proper thickness and diameter. The pawl 42 is centrally located with reference to the introducing member 36, so that pawl 42 will drop into the opening of the washer C, shown in Fig. 23, and thereby prevent further inward movement of the coin-introducing mechanism.

In order to prevent the possibility of a coin engaged by the pawl 43, from springing upward, or as it were, climbing the pawl, I provide the holding member 45, see Figs. 2, 10, and 14, the lower end whereof is provided with a suitable roller 45ª, as clearly shown; the holding member 45 being pivotally connected at 45ᵇ to the frame portion 46, which may be of any suitable construction, preferably so that it may be provided with an adjusting screw 47 whereby the action of spring 48 on member 45 may be regulated. It is evident from the construction shown and described that the roller 45ª will ride over the coin, even though the latter is of greater thickness than the machine is intended to receive, as clearly shown in Fig. 14, and will hold the coin in place.

The bottom member 37, which is stationary, is provided with an opening as shown at 37ª in Fig. 10 at a point within the casing of the machine, immediately beneath the opening 33ª in channel casting 33, in order that the introduced coin or coins may be allowed to drop through it into a suitable receptacle later to be described.

The slide-rod 36 is yieldingly connected by means of spring 49 to the stem 50 of cylinder 51; the ends of the spring 49 being connected to rod 36 and stem 50, respectively, as very clearly shown in Figs. 1 and 10.

The cylinder 51, which may be open at its rear end, as clearly shown in Fig. 10, receives a stationarily mounted piston 52, the rod whereof is secured to the supporting pedestal or frame 53, as clearly shown in Figs. 1, 2, and 10, so as to be held against movement. The lower surface of cylinder 51 is provided with a suitable rack 51ª which meshes with the gear 54 mounted on shaft 55, the shaft 55 having suitable bearings in the pedestal or supporting member 53 and the casing 30 of the machine, as clearly shown in Figs. 1 and 2. The outer end of shaft 55 is provided with a suitable operating crank 56, whereby shaft 55, and with it gear 54, may be rotated, which will induce cylinder 51 to move rearward when the crank is operated in a clockwise direction, thus causing the cylinder to move away from its normal position illustrated in Figs. 1, 2, and 10, and thereby expand spring 49 so that the tension of the latter will induce rod 36 to move inwardly. In order to permit of the movement of cylinder 51 against the piston 52, I provide the cylinder with a port or vent 51ᵇ so as to permit the air to escape during the rearward movement of the cylinder and also to allow the air to enter the cylinder and permit of the return of cylinder 51 to normal position, that is in position where the forwardly presented stem 50 will engage with the rearward end of slide rod 36 and cause the latter to be moved outwardly, back to normal position.

It is evident from the construction just described that movement of operating crank 56, and with it cylinder 51, will not necessarily compel slide-rod 36 to move inwardly to its fullest extent if the slide member is provided with an improper coin which will not pass the detecting mechanism previously described, (namely the mechanism determining the diameter, thickness and proper construction of the facets of the coin) because of the yielding action of spring 49; so that injury to the mechanism of the machine will thus be prevented. Should the coin, however, be a suitable one, so as to pass the detecting mechanism, then the tension of spring 49 is such that slide member 36 will be drawn inwardly to its fullest extent, namely to the point where the coin will be brought to the opening 33ª in channel member 33, and the coin will be allowed to drop into the receptacle beneath.

Figure 3:
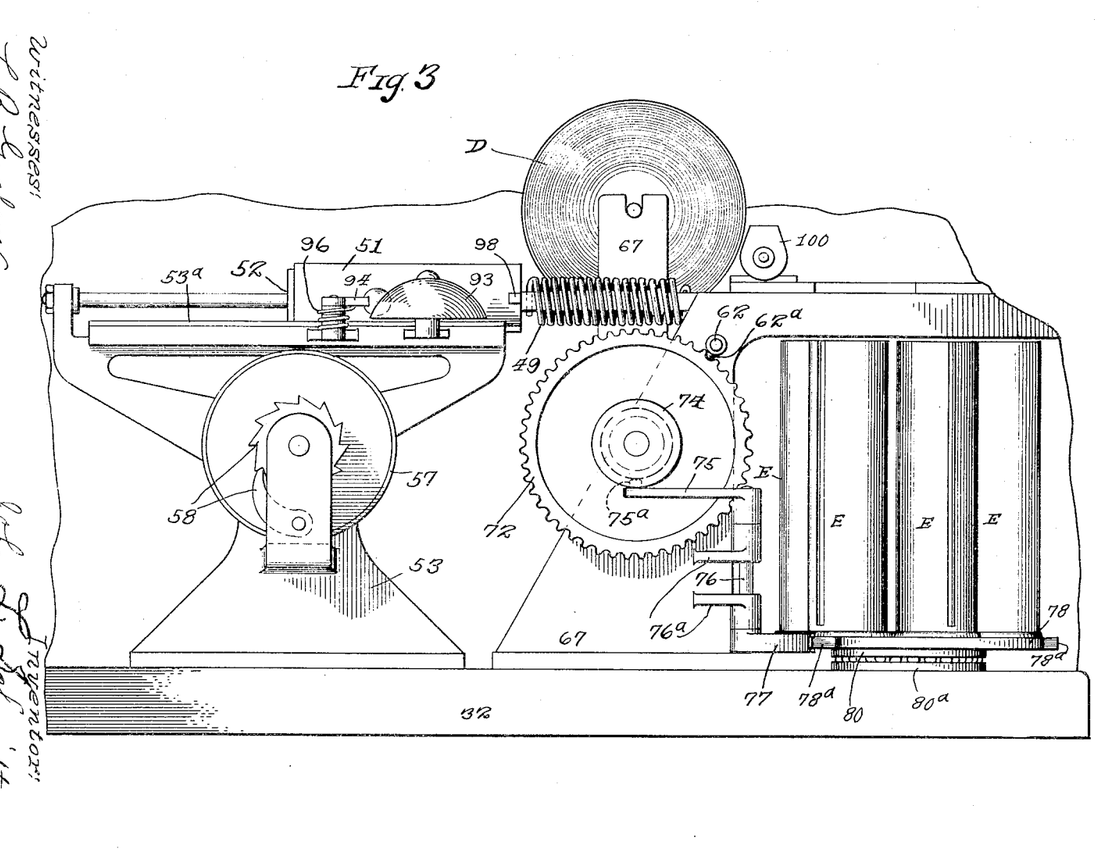
Fig. 3 is a side elevation of the machine showing the opposite side to that disclosed in Fig. 2, with a portion of the casing and the coin inserting mechanism broken away.

In order that shaft 55, and with it gear 54 and cylinder 51, may be returned to normal position, I provide suitable means, as for example band spring 57, which is adapted to act on shaft 55 in such manner as to revolve the shaft in unclockwise direction; suitable mechanism, as for example, the pawl and ratchet mechanism shown at 58, in Figs. 1, 3, and 5, being employed to retain the spring 57 in proper wound condition to exert the desired tension or pulling force on the shaft.

In order that cylinder 51 may be properly guided and maintained in operative position, the pedestal or supporting bracket 53 is provided on its upper surface with any suitable slideway as shown at 53ª, see Figs. 1, 5, and 10.

The slide-rod 36 is provided with a slot 59, as shown in Figs. 2, 9, 10, and 20, which receives a pin 60, which is intended to slide in slot 59 and is also loosely mounted in the elongated slot of link 61 which latter is loosely mounted on the shaft 62, which extends transversely of the machine and to which is secured a gear 63, adapted to mesh with the pinion 64. Pinion 64 is mounted on the roller 65 on which is feathered the type shown at 66, see Figs. 1 and 24, the rollers or shafts 62 and 65 being mounted in the pedestal or bracket 67, very clearly shown in Fig. 2.

Figures 18, 19, 20:
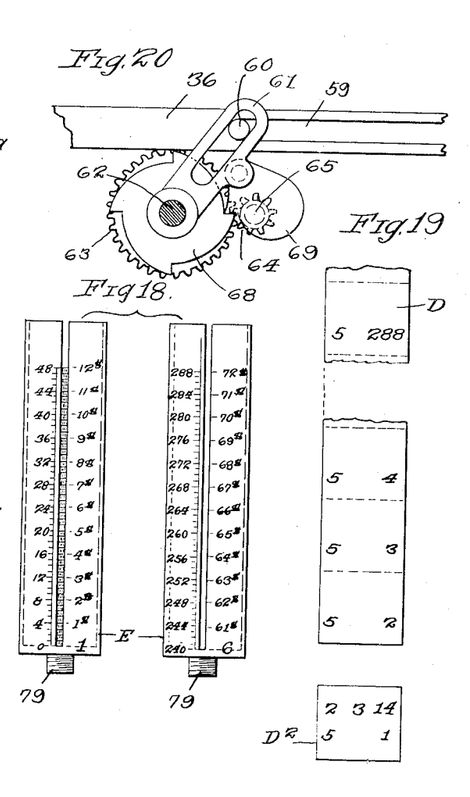
Fig. 18 illustrates two coin-receiving cylinders detached from the holding-mechanism or turn-table, with one of the cylinders shown filled with coins.
Fig. 19 illustrates a portion of the deposit slip or ticket roll, with a portion of the roll severed into a single slip or ticket.
Fig. 20 is a detail view of the ticket or slip feed and ticket-roller operating mechanism, looking at the same from the side opposite to that shown in Fig. 2.

The shaft 62 also has keyed to it the star wheel or four-toothed ratchet 68, which is more clearly shown in Figs. 1 and 20. The link 61 has a dog 69 pivotally secured to one side thereof, see Figs. 20. This dog 69 is adapted to engage with the teeth of star-wheel 68 just before the conclusion of the inward stroke of slide-rod 36, and rotation of shaft 62, and the gears connected thereto, is induced while the slide rod 36 is being returned to its normal position. The length of slot 59 in slide rod 36 is less than the length of stroke or inward movement of rod 36, so that during the inward movement of rod 36, namely before the rod 36 completes its inward stroke, link 61 will be oscillated, and with it dog 69, a distance sufficient to permit the dog to engage with the next succeeding tooth of star-wheel 68. The length of slot 59 is such that no movement of link 61 will occur until slide-rod 36 has moved inwardly just beyond the position shown in Fig. 12; that is, link 61 remains stationary unless a suitable coin has been inserted and has moved the detecting mechanism into position where the further inward travel of slide-rod 36 will be permitted. This movement of the link and dog, 61 and 69 respectively, will compel shaft 62 to be rotated and with it gear 63 a sufficient distance to compel roller 65 to be rotated a complete revolution, which is induced by providing gear 63, for example, with thirty-two teeth and pinion 64 with eight. The shaft 62 is also provided with a feed roller 70, more clearly shown in the detail view, Fig. 15, whereby the ticket strip D is unwound from its roll a sufficient distance, namely a distance corresponding with the length of ticket shown at $D^2$ at the bottom of Fig. 19, where that portion is shown severed. The strip-roll D may be suitably mounted in the upper part of pedestal or frame 67 and is maintained under proper tension by a suitable flat spring 71, see Figs. 1, 2, and 4; one end of the spring being secured to the standard or pedestal 67, as shown in Figs. 2 and 4, while the free end thereof bears against the reel sufficiently to prevent its undue rotation or unwinding.

The opposite end of shaft 62 is provided with a single tooth $62^a$, see Figs. 1 and 3, which meshes with gear 72, secured to stub shaft 73, which has its bearings in frame 67, as clearly shown in Figs. 1 and 4. The shaft 73 is provided with an enlarged hub portion 74, to the outside of gear 72. The hub 74 is provided with an eccentric groove $74^a$, clearly shown in Figs. 1, 4, 16, and 17. The groove $74^a$ is so arranged as to give four oscillatory movements to link 75 during one complete revolution of the hub-portion 74. The link 75 is provided with a pin $75^a$ which rides in the groove $74^a$ and causes link 75 to oscillate and thereby rock shaft 76 to which is secured pawl 77 of what may be termed an escapement; one end of the pawl being provided with a hook portion as at $77^a$ adapted to engage with one of the protrusions or teeth $78^a$ of disk 78; it being understood that disk 78 is adapted to move in clockwise direction through the action of mechanism later described.

The shaft 76 has suitable bearings in the bracket $76^a$, see Fig. 3, which is secured to or may be formed integral with the frame or pedestal 67.

The disk 78 is intended to carry the coin-receiving receptacles or holders E, which are very clearly shown in Figs. 2, 3, and 18. In their preferred construction, the cylinders are provided with a threaded stud 79, see Fig. 18, which is adapted to screw into suitably threaded holes in the disk or plate 78.

In the construction illustrated, the disk 78 is shown provided with six holders E of a diameter slightly larger than the coin for which the unit is intended. These cylinders or receptacles E may be constructed as shown in Fig. 18, provided with a slot extending lengthwise thereof, so as to disclose the coins within, and the surfaces adjacent the slot may be provided with graduations spaced apart to correspond with the thickness of the coins the cylinders are intended to receive. For example, in Fig. 18, each cylinder is shown adapted to receive at least forty-eight coins and of a size corresponding with a quarter of a dollar, thus enabling each cylinder to hold twelve dollars in quarters. These cylinders may be successively numbered from 1 to 6, as indicated in order to tally with the record sheet of the collector; and the deposit strip or roll may be numbered in accordance with the degrees on the six cylinders, that is, running from 1 to 288. With this arrangement, should the collector discover a coin in one of the cylinders, which may have been of proper thickness and diameter, but not be equal to its face value, as for example a plugged coin, he can, in the proper collection of the coins from each cylinder, determine at which point in the cylinder the coin was located, so that the depositor, presenting a ticket corresponding with that number or degree on the cylinder, may have the coin returned to him and receive no credit therefor. For illustration, suppose that the coin in cylinder numbered one, and located at the degree marked 4, is found to be an improper coin, the same may be put aside, and when the holder of deposit-ticket number four presents the same, he may be informed of the fact and receive no credit for that deposit. The deposit strips are numbered with the number of the machine or unit as indicated, for example, in Fig. 19 by the figure 5, and also with numbers from 1 to 288, which latter correspond with the degrees on the cylinders or receptacles.

It will be understood that the rotation of disk 78 is such as to bring one cylinder into proper position beneath the openings 33ª and 37ª, as shown in Figs. 10 and 11, and as shown in dotted lines in Fig. 1. The disk or plate 78 is preferably mounted on the antifriction bearings as shown in Fig. 2, comprising the members 80 and 80ª, which constitute a suitable race-way for the anti-friction bearing, see Fig. 2. The disk or plate 78 is preferably shown provided with a depending stem 81, partly shown in dotted lines in Fig. 2, which extends through the stem or hub 81ª of member 80.

Figure 16:
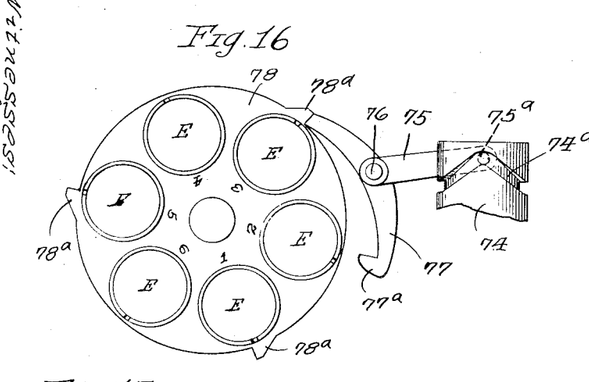
Fig. 16 is a detail plan view of the coin-receiving cylinders and cylinder-holding mechanism and escapement or operating mechanism.
Figure 17:
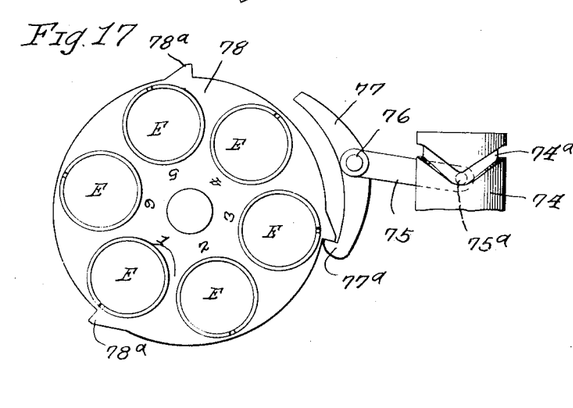
Fig. 17 is a similar view illustrating a different position of the escapement, that is, showing the cylinder-holding mechanism rotated a sixth of its revolution.

Wound about hub 81ª is a spring 81ᵇ, the one end whereof is secured in a proper manner, as at 81ᶜ, to the frame of the machine; the spring being arranged to maintain the member 80, and with it disk or plate 78, under constant pressure, so as to rotate them in clockwise direction; it being understood that the escapement shown in Figs. 16 and 17 will prevent undue rotation of the member 80 and disk or plate 78, except the rotation permitted by the oscillation of member 76, through action of the lever 75 caused by eccentric groove 74ª in the hub 74.

The frame or pedestal 67 is provided with a passage for the strip D, formed at a suitable point beneath the feed-roll 70 by the plate 82, shown in full lines in Fig. 2 and in section in Fig. 15; the plate being properly secured to the frame or pedestal 67 and provided with a slot or opening just sufficient to permit of the passage of the deposit strip D.

The pedestal or frame 67 also provides a suitable guide-way for a knife-plunger 84, carrying the knife-blade 84ª, as shown in Figs. 2 and 15, having shearing contact with the member 82. The opposite end of knife-plunger 84 is slidably mounted in a bearing 85 to which bearing or bracket is pivotally mounted a pawl 86; the pawl 86 at a point intermediate of its ends being provided with a tooth or projection 86ª. The pawl 86 is adapted to drop by gravity so as to allow the tooth 86ª to engage in the notch 84ᵇ shown in Fig. 2, when the knife-plunger 84 has been moved backward away from normal position during the operation of the machine. The hub or crank 56 is provided with a pawl 56ª, see Figs. 1 and 2, which engages with the pin 84ᶜ connected to the end of knife-plunger 84. It is apparent from the construction that the knife-plunger 84 will be drawn backward during the turning of crank 56 a distance sufficient to permit tooth 86ª of pawl 86 to drop into the notch 84ᵇ of the knife-plunger and maintain the latter in its backward position. The backward movement of plunger 84 will compress the spring 87, which surrounds the plunger. The spring 87 is shown bearing against the bracket 85 and the washer or cushioning member 88 which latter bears against the frame or pedestal 67. The cushioning member 88, may be of any suitable resilient material such as rubber and the like so as to deaden the sound or noise which may be caused by the forward movement of the knife-plunger 84 through the action of spring 87 returning the plunger to forward or normal position when pawl 86 is moved out of operative engagement therewith.

Mounted on the shaft 55, namely the shaft to which crank 56 is secured, is a cam 89, see Figs. 1 and 2, on which pin 86ᵇ of pawl 86 rests. The cam 89 is so arranged as to rotate with shaft 55, and has for its function the tilting of pawl 86 into a position where the tooth 86ª will be moved out of the notch 84ᵇ of knife-plunger 84, and thereby release plunger 84 and permit it to move forward through the action of its spring 87. This forward movement of plunger 84 induces its knife-edge 84ª, in conjunction with the knife-edge of plate 82, to shear off the predetermined amount fed from the roll D. The severed portion or ticket falls into a chute 90, see Fig. 2, which extends downwardly and outwardly to the front of the machine and delivers the severed strip or ticket to the depositor.

During the feeding operation of the deposit strip D by means of feed-roll 70 as previously described, the roll 65 carrying type 66 will be rotated through the action of gears 63 and 64, so as to bring the type 66 into printing contact with the portion of the strip D and imprint thereon any suitable indicia, as illustrated for example on the severed portion D², at the bottom of Fig. 19, where the numeral 2 may indicate the week, the numeral 3 indicate the month, and the numeral 14 indicate the year, so that the depositor's entry in his pass book may be properly dated and the time from which interest on the deposit is to begin may be determined.

In order that the type may be properly inked from time to time, I provide a suitable inking cylinder 91, suitably mounted in the pedestal or frame 67 and in contact with the type-rollers as clearly shown in Figs. 1 and 2. The inking mechanism or cylinder may be of any suitable construction, being preferably, however, of the construction shown in Fig. 25, where it is shown in longitudinal sectional view, consisting of a hollow shaft or stem portion 91ª, which not only constitutes the trunnions for the cylinder, but also constitutes the ink-holding chamber. The stem portion 91ª has one of its ends preferably extended and open for the insertion of the ink; the end being closed by the removable screw-cap 92. The stem portion 91ª is provided with a suitable number of perforations as indicated at 91ᵇ, whereby the ink is permitted to seep through into the outer chamber formed by the cylindrical portion 91ᶜ, which latter is in turn provided with a suitable number of perforations 91ᵈ, which permit the ink to saturate the cover 91ᵉ, composed of felt or any other suitable ink-retaining material whereby the ink is transmitted to the type 66.

At a suitable point, as for example on the pedestal or support 53, I show a bell 93, see Fig. 1, which is intended to be operated by means of knocker 94, pivotally mounted at 95 and returned to normal position by means of springs 96, see Figs. 1 and 3. Pivotally secured to knocker 94 is a spring controlled pawl 97 adapted to be engaged by the lug 98 secured to the cylinder 51, so that during the backward movement of the cylinder 51 through the operation of crank 56, shaft 55 and gear 54 meshing with rack 51ᵃ, the lug 98 will engage with pawl 97 and move knocker 94 against the action of its spring, away from bell 93. The yielding relation of pawl 97 of knocker 94 will permit pawl 97 to swing about its pivotal connection and allow lug 98 to pass slightly beyond the pawl, thereby permitting knocker 94 to spring back into normal position, namely into striking relation with bell 93; the yielding relation of pawl 97 will also allow the lug 98 to pass the pawl during the return movement of cylinder 51 to normal position.

The top of the machine may be provided with a sight opening as at 99, see Fig. 2, beneath which is suitably mounted a register 100 which may be of a well known construction, and which is operated by means of arm 101, which is held in normal position by means of a suitable spring as indicated at 102, see Fig. 1; the lower end of arm 101, for example, is shown arranged in the path of plate 36ᵇ when the latter reaches its innermost position, namely beyond opening 33ᵃ in the channel-member 33, when the coin is permitted to drop into the receptacle E; or any point on rod 36 could operate arm 101.

Figures 26, 27, 28, 29:
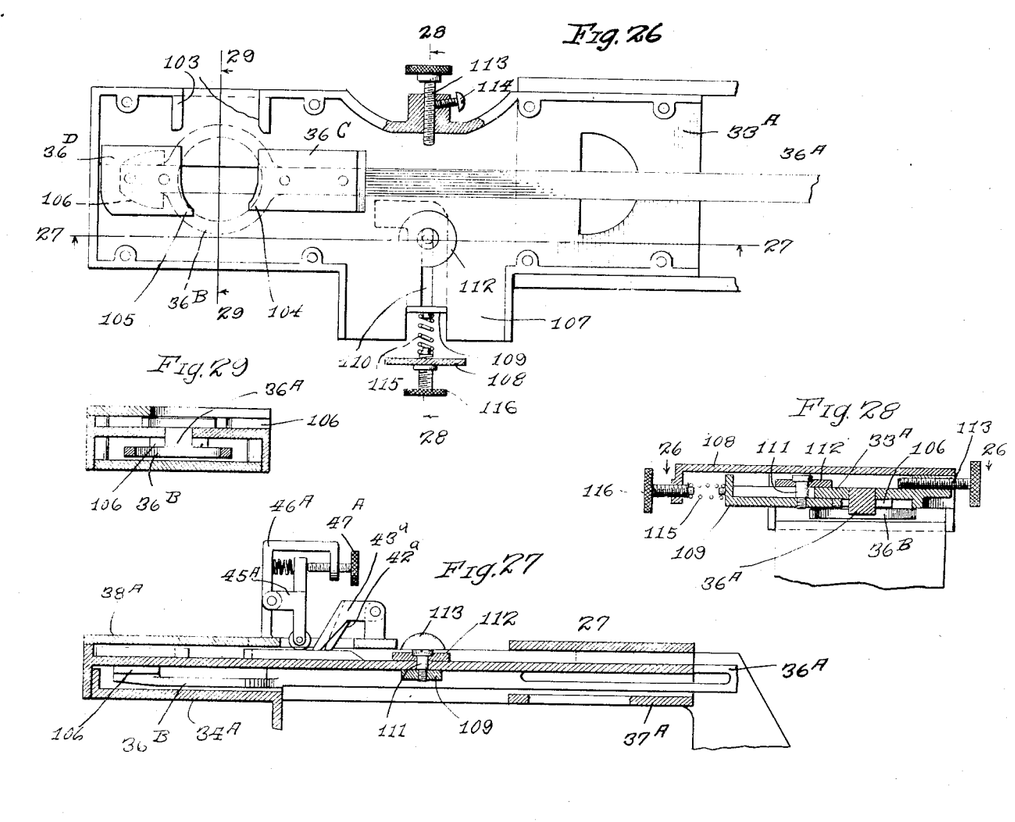
Fig. 26 is a plan view of a modified form of coin-receiving slide mechanism, with the cover removed.
Fig. 27 is a sectional view taken on the line 27—27 of Fig. 26, looking in the direction of the arrows.
Fig. 28 is a cross-section taken on line 28—28 of Fig. 26, looking in the direction of the arrows.
Fig. 29 is a cross-section taken on the line 29—29 of Fig. 26, looking in the direction of the arrows.

In Figs. 26 to 29, inclusive, I show a modified form of the coin detecting mechanism, wherein the channel casting or slide-way 33ᴬ is differently constructed from that illustrated in the previous figures, in that the forward end thereof is provided with the transversely extending lugs 103 which are intended to provide a guideway for the insertion of the coin from the left-hand side of the channel member 33ᴬ, as clearly shown in Fig. 26. The channel member 33ᴬ, like the channel member in the previous figures, is intended to be provided with a cover plate 38ᴬ, see Fig. 27, and with a bottom member or plate 37ᴬ provided with a suitable opening for the passage of the coin in proximity to the rear end of the channel-member; the forward end of the channel-member being supported by the supporting member 34ᴬ. It will be understood, of course, that the channel-member 33ᴬ is so formed as to provide a suitable slide-way or passage for a slide-rod 36ᴬ, the forward end whereof is provided with the ring portion 36ᴮ, which is intended to lie beneath the channel-member 33ᴬ, as clearly shown in Figs. 26 and 27; the channel-member 33ᴬ, as in the previously described construction, being provided with a longitudinally extending slot for the proper inward movement of slide-rod 36ᴬ.

The forward end of slide-rod 36ᴬ is provided with the plates 36ᶜ and 36ᴰ separated a sufficient distance so as to provide a space for coins of predetermined diameter; the opposing faces of the plates 36ᶜ and 36ᴰ being preferably slightly curved so as to provide the protruding portions 104 and 105 which are intended to prevent the too far inward movement of the coin transversely of the slide-way. The forward end of slide-rod 36ᴬ is provided with a transversely extending lug or shoulder, as shown in dotted lines at 106, in Fig. 26, and in full lines in Fig. 29, arranged in a plane above that in which the ring portion 36ᴮ is located, so as to travel immediately beneath or against the under surface of channel member 33ᴬ.

The channel-member 33ᴬ is provided at a point intermediate of its ends with the laterally extending portion 107 to which is secured a bridge member 108 adapted to extend across the channel-member and provide suitable supports for the pawls 42ᵃ and 43ᵃ, which are mounted and adapted to operate in a manner similar to that previously described. The pawl 43ᵃ is preferably provided with a knife edge, extending throughout the width of the slide-way through which the coin must travel, in order to prevent the introduction of a coin of improper thickness; while the pawl 42ᵃ is intended to prevent the introduction of washers or slugs provided with central openings, but which may be of proper thickness and diameter.

In order to maintain the coins in proper position between the plates 36ᶜ and 36ᴰ during the inward movement of slide-rod 36ᴬ, I provide the holding member 45ᴬ, pivotally mounted to the frame portion 46ᴬ, as in the previous construction; the lower end of member 45ᴬ being provided with a suitable roller or rollers intended to ride across the face of the coin; the holding member 45ᴬ being under spring pressure as in the previously described construction; with the pressure being controlled by the adjusting screw 47ᴬ.

The bridge member or portion 108 has mounted beneath it a slidably mounted member 109, see Fig. 28, normally held inwardly, that is with its inner end in the path of the transversely extending lug or shoulder 106; the member 109 being arranged to slide beneath channel-member 33ᴬ.

The channel-member 33ᴬ is provided with the transversely extending slot 110, see Fig. 26, through which extends the pintle 111, on the upper end whereof is rotatably mounted a suitable roller or disk 112; which, in the normal position of member 109, is in proximity to the slide-rod 36ᴬ as shown in Figs. 26 and 28, so as to be engaged by the coin it is intended to deposit.

In order to prevent movement of the coin toward the opposite side of channel-member 33ᴬ, I provide a suitable set screw as at 113, which is intended to be adjusted to a point, relative to disk or roller 112, corresponding with the proper diameter of the coin which the slide-way is intended to receive. To prevent accidental movement of the adjusting screw 113, any suitable locking means may be provided, as for example the small set screw 114.

The plate or member 109 is maintained in its inward or normal position by a suitable spring as shown for example at 115, one end whereof bears against the upwardly presented end of member 109, while the other end bears against adjusting member or screw 116, whereby the tension on plate or member 109 may be determined. It is apparent from the construction shown and described, that the coin inserted between plates 36ᶜ and 36ᴰ of slide-rod 36ᴬ must be of proper diameter in order to engage disk or roller 112, so as to move the latter, and with it plate or member 109, beyond the path of the coin and therefore move plate 109 out of the path of the shoulder or lug 106, to allow the further inward travel or movement of slide-rod 36ᴬ; the set screw 113 preventing the coin moving toward that side of the channel-member and maintaining the coin in proper position.

It is apparent from the foregoing description that the deposit strip feeding mechanism will not be operated until the coin inserting mechanism has passed beyond the coin detecting mechanism, so that a deposit ticket cannot be obtained through the operation of the crank 56 and operating shaft 55 at a time when a spurious or improper coin has been inserted by the operator; the yielding connection between the cylinder 51 and the inserting slide rod 36 will permit the operator to turn the crank 56 without, however, in any way injuring the mechanism of the machine. The cutting mechanism will be placed into cutting position through the operation of crank 56 and be locked in place simultaneously with the positioning of the deposit strip feeding mechanism, and both of these conditions will merely take place at a time when the coin inserting mechanism has reached the point where the coin is brought over opening 33ᵃ in channel-member 33 and allowed to drop into the receptacle E. The construction shown and described, therefore, prevents the improper obtaining of a deposit ticket.

I have shown and described what I believe to be the simplest and best forms of my invention; the same may, however, be altered in certain respects without departing from the spirit of my invention, and I do not wish, therefore, to limit myself to the exact construction shown and described.

What I claim is:—

1. In a machine of the class described, the combination of a casing, coin introducing means slidably mounted in the casing, means having yielding connection with said slidably mounted means whereby the latter are moved into said casing, a deposit strip feeding mechanism, and means intermediate of said slidably mounted means and the feeding mechanism adapted to be moved into operative relation with the feeding mechanism during the inward movement of said slidably mounted means and said feeding mechanism operated by the movement of said slidably mounted means to normal position.

2. In a machine of the class described, the combination of a casing, a slidably mounted coin-introducing member, operating mechanism having yielding connection with said slidably mounted member whereby the latter is drawn into said casing, means whereby said operating mechanism is returned to normal position and the slidably mounted member moved outwardly, a deposit strip feeding mechanism, means intermediate of said mechanism and the slidably mounted member adapted to be moved into operative relation with said mechanism during the inward movement of said slidably mounted member and the feeding mechanism operated during the return stroke of said member back to normal position, and means adapted to sever the deposit strip upon the movement of the operating mechanism back to normal position.

3. In a machine of the class described, a coin-introducing member, strip-feeding mechanism, means intermediate of said member and said mechanism adapted to effect operative relation between the same during the initial movement of the member, the mechanism being actuated by movement of said member back to normal position, actuating means having yielding relation with said member for imparting initial movement to the latter and arranged to positively force said member back to normal position, and strip-severing mechanism arranged to automatically operate upon the return of said member to normal position, said mechanism being operable through movement of said second means.

4. In a machine of the class described, the combination of a slidably mounted coin introducing member arranged to permit the coins to drop by gravity when said member reaches a predetermined point, with a deposit strip feeding mechanism adapted to feed a predetermined portion of said strip, means intermediate of said mechanism and said member arranged to effect operative relation between the mechanism and said member during the inward travel of the latter and induce operation of the feeding mechanism during return movement of said member to normal position, and printing mechanism adapted to be brought into engagement with the deposit strip during movement of said feeding mechanism.

5. In a machine of the class described, the combination with a slidably mounted coin introducing member, a strip feeding mechanism adapted to be operated to a predetermined degree upon the return movement of said member to normal position, coin holding receptacles arranged to receive the coins from said slidably mounted member, of means intermediate of the strip feeding mechanism and said coin holding receptacles whereby the latter are shifted after a predetermined number of operations of said feeding mechanism.

6. In a machine of the class described, a coin-introducing slide, strip-feeding mechanism adapted to be placed into operative relation with the slide during inward movement of the latter, said feeding mechanism being operated during return movement of the slide to normal position, strip-severing mechanism arranged to return to normal and severing position through the action of a spring, actuating means common to said slide and the severing mechanism, whereby the former is moved inward to introduce a coin, while the latter is moved against the action of its spring, and means intermediate of said actuating means and the severing mechanism whereby the latter is held in retracted position during a portion of the movement of said actuating means and released during the remaining portion of movement thereof.

7. In a machine of the class described, the combination of a coin introducing member, a strip feeding mechanism arranged to operate when the introducing member returns to normal position, with spring controlled cutting mechanism operable during the return movement of the coin introducing member to normal position, and operating means yieldingly connected with said member and having operative engagement with said cutting mechanism.

8. In a machine of the class described, the combination of coin-introducing means, strip-feeding mechanism operable by said means upon movement of the latter back to normal position, with a receptacle holding turn-table or member adapted to bring the receptacles beneath the discharging point of said coin-introducing means, and means whereby said turn-table is permitted to have a predetermined degree of movement through the operation of said strip-feeding mechanism.

9. In a machine of the class described, the combination of coin-introducing means adapted to release the coin in the machine when said means reaches a predetermined point, strip-feeding mechanism operable by said means upon movement of the latter back to normal position, with a rotating member or turn-table provided with a series of coin-holding receptacles, means whereby said turn-table is induced to rotate, and means intermediate of said turn-table and the strip-feeding mechanism whereby the degree and moment of rotation of the turn-table are controlled.

10. In a machine of the class described, the combination of coin-introducing means adapted to release the coin when said means reaches a predetermined point in its movement, strip-feeding mechanism operable by said means when the latter returns to normal position, with a rotatable mounted member or turn-table provided with coin-receiving receptacles, and escapement mechanism intermediate of the strip-feeding mechanism and said turn-table whereby the latter is permitted to rotate upon a predetermined number of operations of said strip-feeding mechanism.

11. In a machine of the class described, the combination of coin-introducing means, mechanism yieldingly connected with said means whereby the latter are operated, strip-feeding mechanism operable by said means upon the return of the latter to normal position, with spring controlled cutting mechanism operatively connected with said first mentioned mechanism whereby said cutting mechanism is moved out of cutting position and held against action of the spring during the initial movement of said coin-introducing means, and means whereby the cutting mechanism is released when said first-mentioned mechanism returns to normal position.

12. In a machine of the class described, the combination of coin-introducing means, rotative mechanism yieldingly connected with said means whereby the latter are operated, with cutting mechanism comprising a fixedly mounted member, a spring-controlled movable cutting member operatively connected with said rotative mechanism so as to be moved against the action of its spring when said means are actuated through rotation of said rotative mechanism, means whereby said cutting member is locked in its retracted or moved position, and means whereby said second-mentioned means is moved out of locking position during the return rotation of said rotative mechanism and the spring controlled member released and permitted to move into cutting engagement with said fixedly mounted cutting member.

13. In a machine of the class described, the combination of coin-introducing means comprising a slidably mounted member, means whereby said slidably mounted member is operated, with cutting mechanism comprising a fixedly mounted cutting member and a movable cutting member, said movable member being spring-controlled, means intermediate of said operating means and the movable cutting member whereby the latter is moved against the action of its spring and locked in place during the initial movement of said operating means, and means intermediate of the operating means and said last mentioned means whereby the movable cutting member will be released during the movement of the operating means to normal position.

14. In a machine of the class described, the combination of a slidably mounted coin-introducing member, mechanism having yielding connection with said member whereby the latter is operated and returned to normal position, a strip-feeding mechanism adapted to be placed into operative relation with the coin-introducing member during the initial movement of the latter and moved a predetermined degree during the return movement of said member, cutting mechanism for said strip adapted to be moved into cutting position during the return to normal position of said coin-introducing member, with coin receptacle shifting mechanism adapted to be moved a predetermined degree after a prearranged number of operations of said feeding-mechanism.

15. In a machine of the class described, the combination of a coin-introducing member, means having yielding connection with said member whereby the latter is operated, strip-feeding mechanism comprising rollers having positive engagement with each other, one of said rollers constituting a printing roller, with a rotating member or turn-table provided with a plurality of coin-holding receptacles, and means whereby movement of said turn-table is determined by a prearranged number of operations of said feeding mechanism.

16. In a machine of the class described, provided with a coin-introducing slide-rod, feeding mechanism comprising a pair of feed-rolls, a link, concentrically mounted with one of said feed-rolls, having slot and pin connection with said slide-rod so as to be oscillated when the pin reaches opposite ends of the slot, and means intermediate of said link and one of said feed rolls arranged to be moved into operative relation with said feed-rolls during the inward movement of said slide-rod whereby the feed-rolls will be moved a predetermined degree upon the return of said slide-rod to normal position.

17. In a machine of the class described, provided with a coin-introducing slide-rod, feeding mechanism comprising a pair of feed-rolls, an oscillatingly mounted member adapted to be oscillated by said slide-rod when the latter reaches the limits of its movements, and a pivoted member carried by said oscillatingly mounted member and adapted to be moved into operative relation with one of said feed-rolls during the inward movement of said slide-rod, whereby the feed-rolls will be moved a predetermined degree upon the return of said slide-rod to normal position.

18. In a machine of the class described, provided with a coin-introducing slide-rod, feeding mechanism comprising feed-rolls, an oscillatingly mounted member having slot and pin connection with said slide-rod so as to be oscillated when the rod reaches the limits of its inward and outward movements, and a pivoted member carried by said first member and adapted to be placed into operative relation with one of said feed-rolls by the oscillations of said first member whereby said feed-rolls will be moved a predetermined degree upon the return movement of said slide-rod to normal position.

19. In a machine of the class described, provided with a coin-introducing slide-rod having an elongated slot, feeding mechanism comprising feed-rolls, an oscillating link mounted on the axis of one of said rolls, said link being provided with a slot, a pin arranged to take into the slots of the rod and said link so as to oscillate the link when the rod reaches the inward and outward limits of its movements, and a pawl and ratchet connection intermediate of said link and one of said feed-rolls arranged to move the feed-rolls a predetermined degree upon the return movement of said slide-rod to normal position.

JOHN L. SCHMIDT.

Witnesses:
LORENZ SCHMIDT,
WILLIAM F. BECKER.